United States Patent
Park et al.

(10) Patent No.: US 11,242,261 B2
(45) Date of Patent: Feb. 8, 2022

(54) METHODS AND SYSTEMS FOR PRODUCING ACTIVATED SILICATE BASED MATERIALS USING SUSTAINABLE ENERGY AND MATERIALS

(71) Applicant: THE TRUSTEES OF COLUMBIA UNIVERSITY IN THE CITY OF NEW YORK, New York, NY (US)

(72) Inventors: Ah-Hyung Alissa Park, New York, NY (US); Xiaozhou Zhou, New York, NY (US); Chengchuan Zhou, New York, NY (US)

(*) Notice: Subject to any disclaimer, the term of this patent is extended or adjusted under 35 U.S.C. 154(b) by 99 days.

(21) Appl. No.: 16/333,759

(22) PCT Filed: Sep. 19, 2017

(86) PCT No.: PCT/US2017/052239
§ 371 (c)(1),
(2) Date: Mar. 15, 2019

(87) PCT Pub. No.: WO2018/053497
PCT Pub. Date: Mar. 22, 2018

(65) Prior Publication Data
US 2019/0210883 A1   Jul. 11, 2019

Related U.S. Application Data

(60) Provisional application No. 62/396,690, filed on Sep. 19, 2016.

(51) Int. Cl.
C01B 33/20 (2006.01)
C01F 11/12 (2006.01)
C01F 5/14 (2006.01)

(52) U.S. Cl.
CPC .............. *C01B 33/20* (2013.01); *C01F 5/14* (2013.01); *C01F 11/12* (2013.01); *Y02C 20/40* (2020.08); *Y02P 20/129* (2015.11)

(58) Field of Classification Search
CPC ......... C01B 33/20; C01B 33/22; C01B 33/24; C01B 33/26; C01B 33/38; C01B 33/40;
(Continued)

(56) References Cited

U.S. PATENT DOCUMENTS

| 4,260,414 A | 4/1981 | Suzuki et al. |
| 2010/0150799 A1 | 6/2010 | Boudreault et al. |

FOREIGN PATENT DOCUMENTS

| WO | 1996037286 | 11/1996 |
| WO | 2015154887 | 10/2015 |

OTHER PUBLICATIONS

Search Report and Written Opinion of the International Searching Authority from International Patent Application No. PCT/US2017/052239, dated Sep. 19, 2017.

*Primary Examiner* — Smita S Patel
(74) *Attorney, Agent, or Firm* — Bayramoglu Law Offices LLC

(57) ABSTRACT

Methods and systems for producing activated silicate materials are disclosed. A silicate source material is provided for reaction with a reforming agent in a reforming process. The reforming process is a hydrothermal process and/or a high temperature silicate reforming (HTSR) process. The reaction materials are brought to the suitable reaction temperature via a heat source in the presence of the suitable reaction medium. The activated silicate materials exhibit improved reactivity compared to non-activated silicate materials and thus are advantageously employed in elemental extraction processes to produce a valuable material product.

6 Claims, 13 Drawing Sheets

(58) Field of Classification Search
CPC .... C01B 33/00; C01F 5/22; C01F 5/20; C01F 5/14; C01F 11/00; C01F 11/12; Y02C 20/40; Y02P 20/129
See application file for complete search history.

METHODS AND SYSTEMS FOR PRODUCING ACTIVATED SILICATE BASED MATERIALS USING SUSTAINABLE ENERGY AND MATERIALS

CROSS REFERENCE TO RELATED APPLICATION(S)

This application is a national stage patent filing of International Patent Application No. PCT/US2017/052239, filed Sep. 19, 2017, which claims the benefit of U.S. Provisional Application No. 62/396,690, filed Sep. 19, 2016, which is incorporated by reference as if disclosed herein in its entirety.

BACKGROUND

A large quantity of useful and valuable elements, such as Ca, Mg, Fe, Al, Si, etc., are stored in different kinds of silicate minerals, such as Serpentine, Wollastonite, Olivine, etc., and industrial silicate wastes, such as slag, mine tailing and fly ash etc. After being extracted from the silicate based materials, these elements can be employed to produce different chemicals, such as carbonates, oxides/hydroxides, halides, etc., which are critical for many industrial process, such as chemical process, and metallurgical process, etc.

However, since the reactivity of the natural silicate mineral is not high enough, the material and the energy consumption of traditional elemental extraction processes are normally high, leading to a high process cost, while the process kinetics and the conversion are relatively low. Methods need to be developed to enhance the material reactivity, so that the process kinetics and the conversion can be improved, while the cost due to the material and the energy consumption can be well controlled to achieve overall economic feasibility. Preferably, the method can be built up on sustainable utilization of material and energy.

SUMMARY

Some embodiments of the disclosed subject matter are directed to a method of producing an activated silicate material. In some embodiments, a silicate source material is provided and intermixed with a reforming agent. In some embodiments, heat is provided to the silicate source material and reforming agent under conditions configured to initiate a reforming reaction. In some embodiments, the heat is a byproduct from another process, e.g., waste heat from an industrial process.

The reforming process yields an activated silicate material. In some embodiments, the reforming process is a hydrothermal process. In some embodiments, the reforming process is a high temperature silicate reforming (HTSR) process. Value materials are then extracted from the activated silicate material via an elemental extraction process. In some embodiments, the elemental extraction process is a mineral carbonation process, oxides/hydroxide production process, halide production process, ferrous metal production process, nonferrous metal production process, rare earth production process, etc., or a combination thereof. In some embodiments, the activated silicate material is cooled prior to the elemental extraction process. In some embodiments, the reforming agent is recycled after value materials are removed from the activated silicate material.

Some embodiments of the present disclosure are directed to a system for producing the activated silicate material discussed above. In some embodiments, the system includes a reaction chamber in communication with a source of silicate material, a source of reforming agent, a reaction medium, and a source of heat. In some embodiments, the system includes an activated silicate material output in configuration with an elemental extraction module configured to extract value materials from the activated silicate material.

Some embodiments of the disclosed subject matter are directed to a method of innovative industrial waste energy utilization for silicate based material activation. In some embodiments, exhausted steam is used as both part of the reaction medium and the heat source for the hydrothermal process. In some embodiments, molten slag byproduct from another process serves as both the silicate source material and the heat source for the HTSR process.

Some embodiments of the disclosed subject matter are directed to a method of molten slag heat utilization (MSHU) to conduct endothermic processes. In some embodiments, molten slag byproduct from another process is intermixed with the reforming agents to conduct the HTSR process with the molten slag heat. In some embodiments, molten slag byproduct is intermixed with coal and water to conduct the coal gasification process with the molten slag heat. In some embodiments, molten slag byproduct is intermixed with methane and water to conduct the steam reforming process with the molten slag heat.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
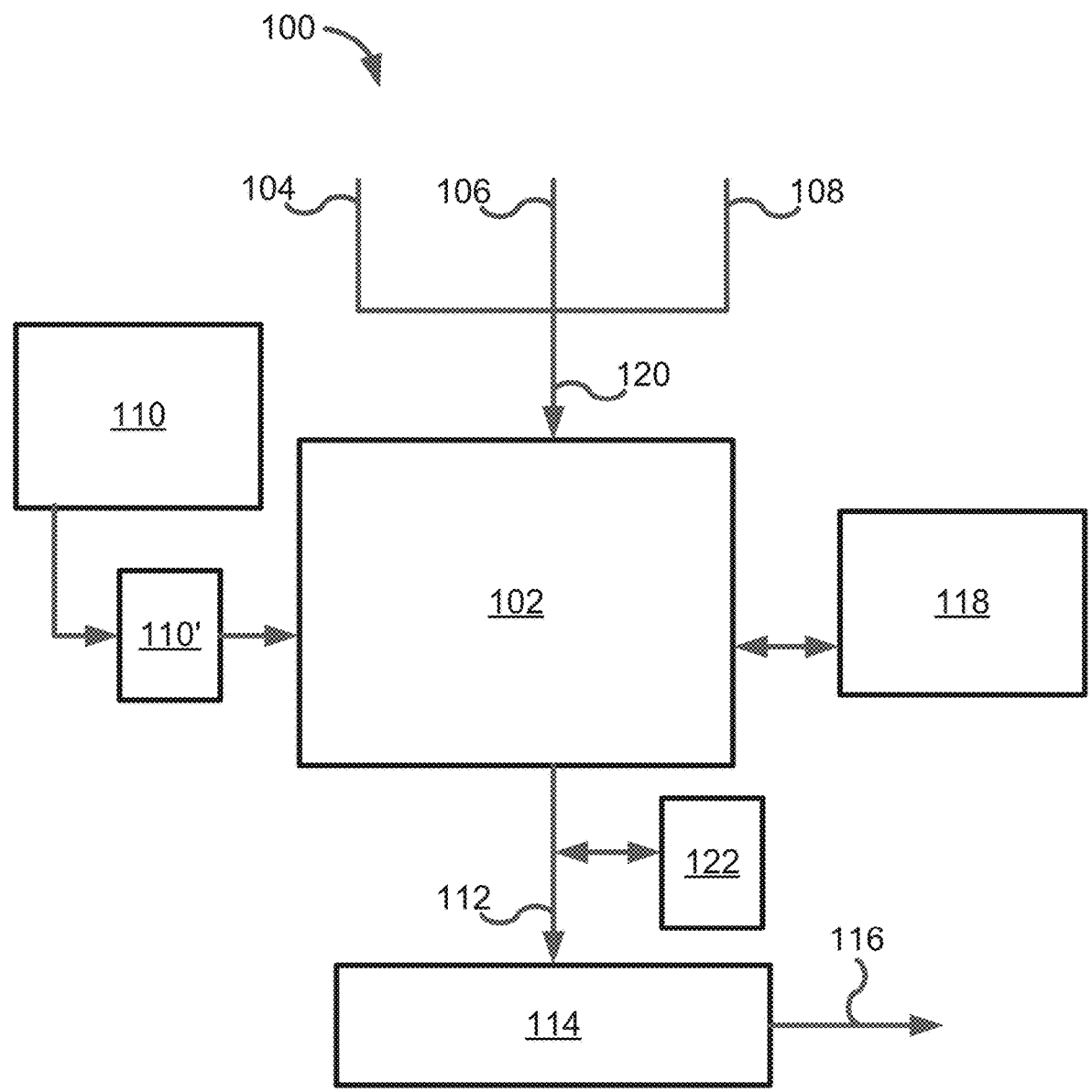
FIG. 1 is a schematic drawing of a system for producing highly activated silicate material according to some embodiments of the present disclosure.

Referring now to FIG. 1, aspects of the disclosed subject matter include a system 100 for producing activated silicate material. In some embodiments, system 100 includes a reaction chamber 102 for reacting a silicate source material with a reforming agent. In some embodiments, a plurality of reaction chambers 102 are operated in parallel. In some embodiments, a plurality of reaction chambers 102 are operated in series. In some embodiments, system 100 includes a silicate material input 104 in communication with reaction chamber 102 which provides the silicate source material to the reaction chamber. In some embodiments, the silicate source material includes a calcium mineral, a magnesium mineral, slag, mine tailing, fly ash, kiln dust, or a combination thereof. In some embodiments, the silicate source material is naturally occurring, such as serpentine, olivine, wollastonite, etc., or a combination thereof. In some embodiments, the silicate source material is a byproduct of another industrial process. In some embodiments, the silicate source material is a solid. In some embodiments, the silicate source material is a slurry, as will be described in greater detail below.

In some embodiments, system 100 includes a reforming agent input 106 in communication with reaction chamber 102 which provides a source of reforming agent to the reaction chamber. As will be discussed in greater detail below, in some embodiments the reforming process is a hydrothermal process. In some embodiments, the reforming process is a HTSR process. In some embodiments, the hydrothermal reforming agent includes sodium hydroxide (NaOH), potassium hydroxide (KOH), ammonium hydroxide ($NH_4OH$), lithium metaborate ($LiBO_2$), lithium tetraborate ($Li_2B_4O_7$), sodium carbonate/bicarbonate ($Na_2CO_3$/$NaHCO_3$), potassium carbonate/bicarbonate ($K_2CO_3$/$KHCO_3$), ammonium carbonate/bicarbonate (($NH_4$)$_2CO_3$/($NH_4$)$HCO_3$), or a combination thereof. In some embodiments, the HTSR reforming agent is composed acidic, basic, or neutral reforming agents. In some embodiments, acidic reforming agents for HTSR include boron trioxide ($B_2O_3$), lithium tetraborate ($Li_2B_4O_7$), silica ($SiO_2$), ammonium ($NH^{4+}$) based acidic salts, etc., or combinations thereof. In some embodiments, basic reforming agents for HTSR include, borax ($Na_2B_4O_7 \cdot 10H_2O$), lithium metaborate ($LiBO_2$), sodium hydroxide (NaOH), potassium hydroxide (KOH), sodium carbonate/bicarbonate ($Na_2CO_3$/$NaHCO_3$), ammonium based base and basic salts, etc., or combinations thereof. In some embodiments, neutral reforming agents for HTSR include sodium chloride (NaCl), fluorite ($CaF_2$), alumina ($Al_2O_3$), ammonium based neutral salts, etc., or combinations thereof.

In some embodiments, system 100 includes a reaction medium input 108 in communication with reaction chamber 102 which provides a reaction medium to the reaction chamber. In some embodiments, the reaction medium is an industrial plant exhaust source, air source, nitrogen gas source, oxygen gas source, carbon monoxide gas source, or a combination thereof.

In some embodiments, system 100 includes a heat source 110 configured to provide heat to the system. In some embodiments, heat from heat source 110 is a byproduct from another process that is recycled for use in system 100. In some embodiments, heat from heat source 110 is waste heat from a separate process, e.g., from industrial power production. In some embodiments, heat source 110 is an industrial energy production source, an industrial energy production process, waste energy source, molten iron slag, molten steel slag, a flue gas, an exhaust gas, exhausted steam, or a combination thereof. In some embodiments, system 100 includes at least one heat exchanger 110' configured to communicate heat from heat source 100 to the system.

In some embodiments, system 100 includes an activated silicate material output 112 from reaction chamber 102. Activated silicate material output 112 is in communication with and provides activated silicate material to an elemental extraction module 114. As will be discussed in greater detail below, elemental extraction module 114 is configured to extract value materials 116 from the activated silicate material utilizing one or more extraction processes. In some embodiments, elemental extraction module 114 performs a mineral carbonation process, oxides/hydroxide production process, halide production process, ferrous metal production process, nonferrous metal production process, rare earth production process, or a combination thereof. In some embodiments, elemental extraction module includes all additional components necessary to facilitate value material recovery using these processes. Value materials that can be extracted from the activated silicate material using the systems and methods of the present disclosure include, but are not limited to, Ca, Mg, Al, Fe, Si, rare earth elements, etc.; oxides and hydroxides of Al, Fe, Ti, Mn, etc.; metal carbonates; silicates and silica; or combinations thereof.

In some embodiments, system 100 includes an process module 118. In some embodiments, process module 118 is in communication with the non-activated silicate material source. In some embodiments, process module 118 is in communication with heat source 110. In some embodiments, process module 118 is in communication with reaction chamber 102. Process module 118 is configured to initiate a non-silicate-activation process. In some embodiments, the non-silicate-activation process is performed separately from the silicate activation process. In some embodiments, the non-silicate-activation process is performed concurrently with the silicate activation process. In some embodiments, the non-silicate-activation process utilizes the components of system 100, e.g., heat from molten slag via MSHU, which is discussed in greater detail below.

Figure 2A:
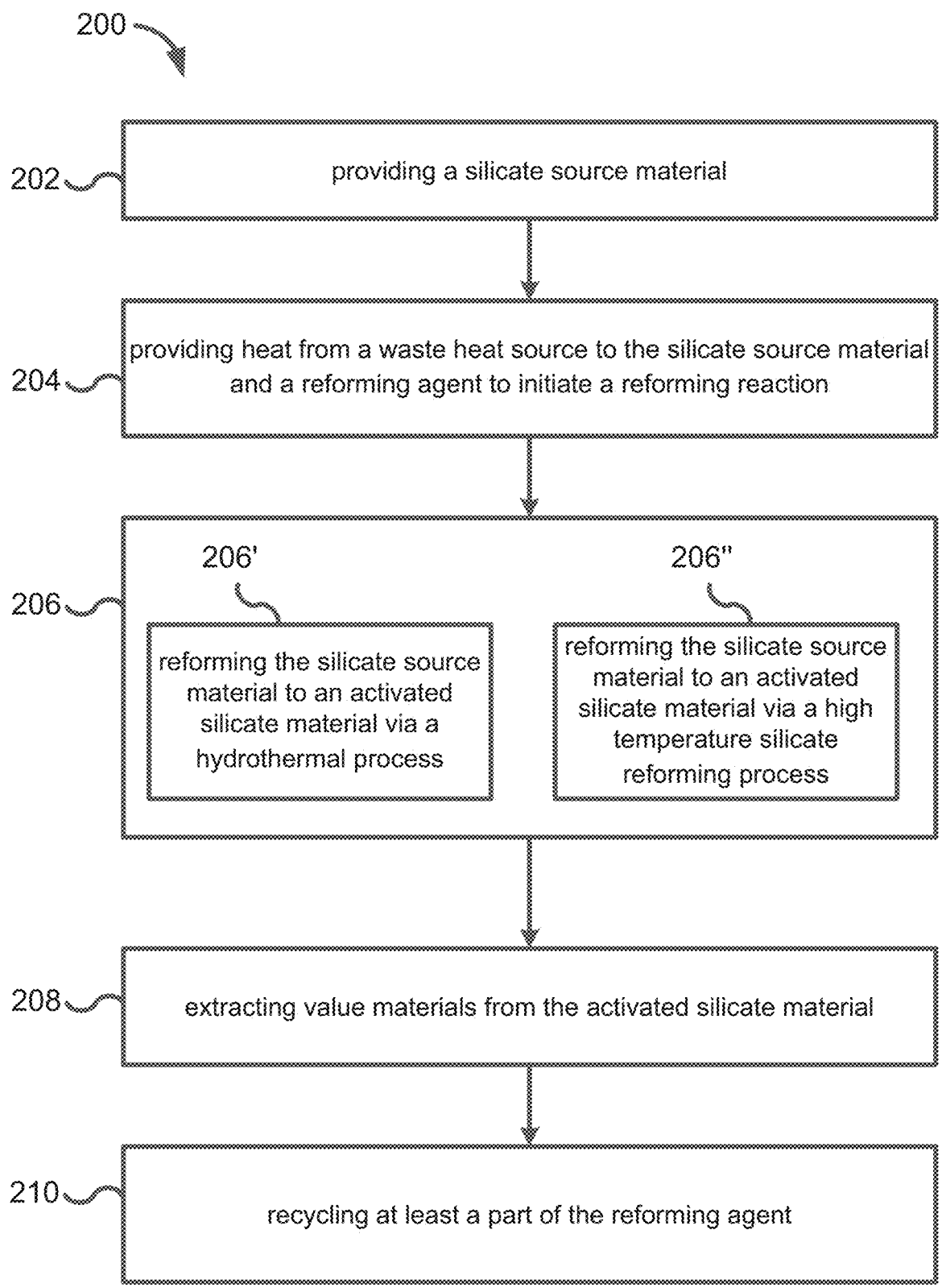
FIG. 2A is a chart of a method of producing highly activated silicate material according to some embodiments of the present disclosure.

In some embodiments, system 100 includes one or more conduits 120 connecting system components such as silicate material input 104, reforming agent input 106, reaction medium input 108, elemental extraction module 114, etc. In some embodiments, the system includes a cooling apparatus 122 for cooling the activated silicate material after reforming the silicate source materials. Referring now to FIG. 2A, some embodiments of the present disclosure are directed to a method 200 of producing activated silicate material. At 202, a silicate source material is provided. At 204, heat is provided to drive a reforming reaction of the silicate source material with a reforming agent. As discussed above, in some embodiments, the heat provided for the reforming reaction is waste heat from another process.

At 206, the silicate source material is reformed to an activated silicate material with the reforming agent via the reforming reaction. As discussed above, in some embodiments, the reaction occurs in a reaction chamber, such as reaction chamber 102 described above. Also as discussed above, in some embodiments, the reforming step 206 is a hydrothermal process 206'. Referring specifically to hydrothermal process 206', the silicate source material and reforming agent are intermixed with a liquid to produce a slurry. In some embodiments, the liquid is water. In some embodiments, the water-based slurry is mixed to a density of about 10 percent by weight to about 20 percent by weight solids. In some embodiments, the water-based slurry is mixed to a density of about 15 percent by weight solids. In some embodiments, the weight ratio of silicate source material to reforming agent is from about 1:1 to about 100:1. As discussed above, heat is applied at 204 to the slurry. In some embodiments, heat is applied 204 to bring the reaction temperature to about 100° C. to about 300° C. for hydrothermal process 206'. In some embodiments, heat is applied 204 to bring the reaction temperature to about 120° C. to about 250° C. for hydrothermal process 206'. In some embodiments, hydrothermal process 206' is performed under pressurized conditions. In some embodiments, the reaction chamber is pre-pressurized, e.g., with air or nitrogen gas. In some embodiments, hydrothermal process 206' has a reaction time of about 1 hour to about 3 hours. In some embodiments, hydrothermal process 206' has a reaction time of about 2 hours. In some embodiments, the silicate source material and reforming agent are intermixed with exhausted steam. In these embodiments, integrated exhausted steam can advantageously act as both the slurry-producing liquid and the heat source at 204. The overall advantages of the systems and methods of the present disclosure are discussed in greater detail below.

In some embodiments, the reforming step 206 is an HTSR process 206". Referring specifically to HTSR process 206", the silicate source material and reforming agent are intermixed at a high reaction temperate using heat provided at 204. In some embodiments, the weight ratio of silicate source material to reforming agent is from about 0.1:1 to about 100:1. The heat applied 204 to bring the reaction temperature to about 300° C. to about 1500° C. In some embodiments, the reaction temperature is not lower than the melting temperature of the reforming agent. In some embodiments, HTSR process 206" has a reaction time of about 1 minute to about 12 hours. In some embodiments, the reforming reaction of HTSR process 206" is performed in an anhydrous environment. In some embodiments, the reforming agent is intermixed with molten slag. In these embodiments, molten slag advantageously acts as both the silicate source material and the heat source at 204. In some embodiments, HTSR process 206" includes intermixing additional silicate source materials with the reforming agent and the molten slag (not pictured).

At 208, in some embodiments, the activated silicate material is subjected to an elemental extraction process. Elemental extraction process 208 extracts value materials from the activated silicate material. The reforming 206 improves the kinetics and conversion of elemental extraction process 208. As discussed above, elemental extraction process 208 is a mineral carbonation process, oxides/hydroxide production process, halide production process, ferrous metal production process, nonferrous metal production process, rare earth production process, etc., or a combination thereof. At 210, in some embodiments, at least a part of the reforming agent is recycled after value materials are separated from the activated silicate material.

Figure 2B:
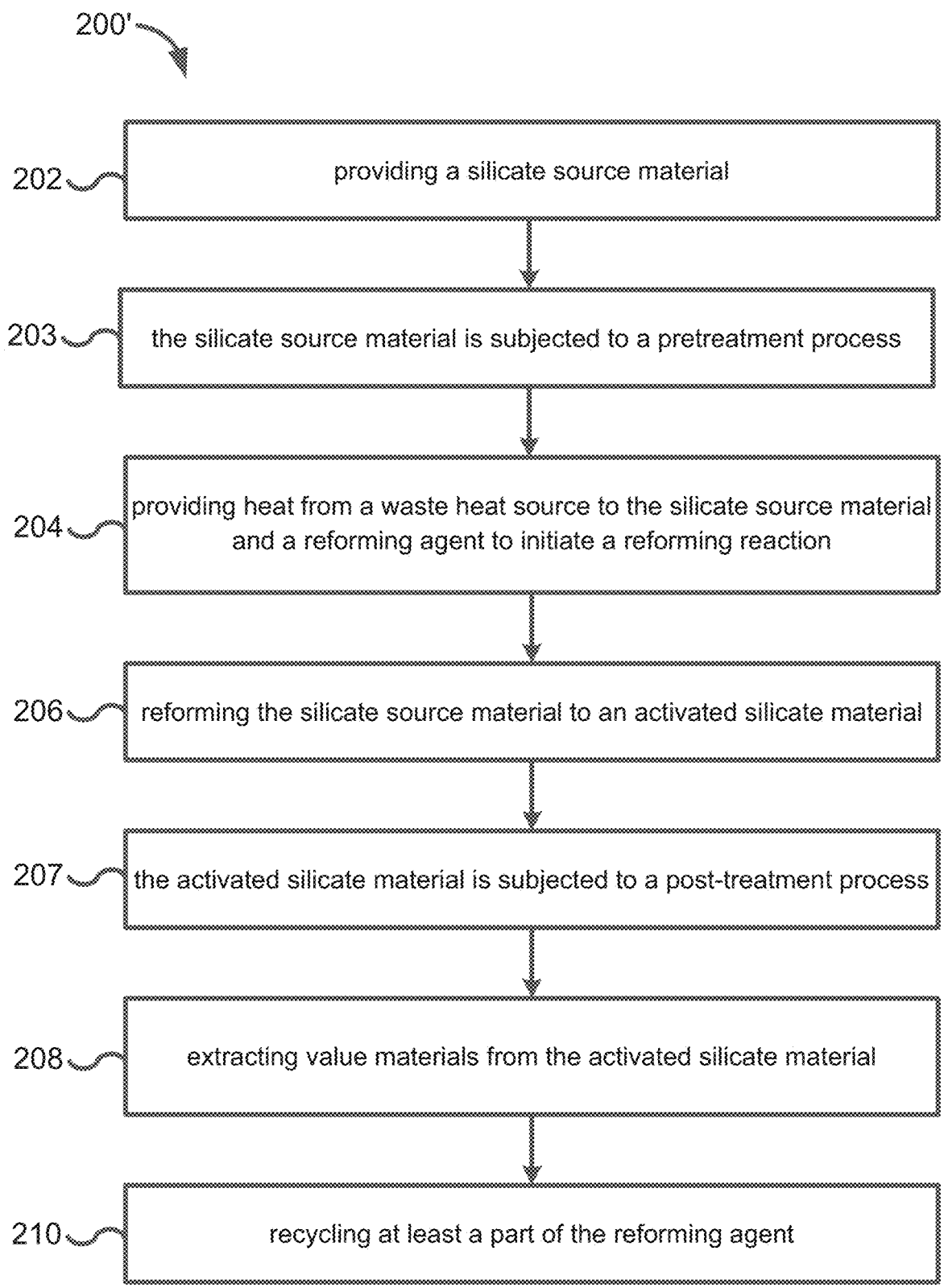
FIG. 2B is a chart of a method of producing highly activated silicate material according to some embodiments of the present disclosure.

Referring now to FIG. 2B and method 200', at 203, in some embodiments, the silicate source material is subjected to a pretreatment process. In some embodiments, pretreatment 203 includes grinding the silicate source material, heat treatment, leaching, etc., or combinations thereof. At 207, in some embodiments, the activated silicate material is subjected to a post-treatment process. In some embodiments, post-treatment 207 includes cooling the activated silicate material. In some embodiments, cooling includes annealing, water/aqueous solvent quenching, oil quenching, air cooling, etc., or combinations thereof. In some embodiments, post-treatment 207 includes grinding the activated silicate materials to produce a product having a particle size distribution between about 50 μm to about 800 μm. In some embodiments, the particle size distribution is between about 100 μm to about 700 μm. In some embodiments, the particle size distribution is between about 100 μm to about 200 μm.

Figure 3:
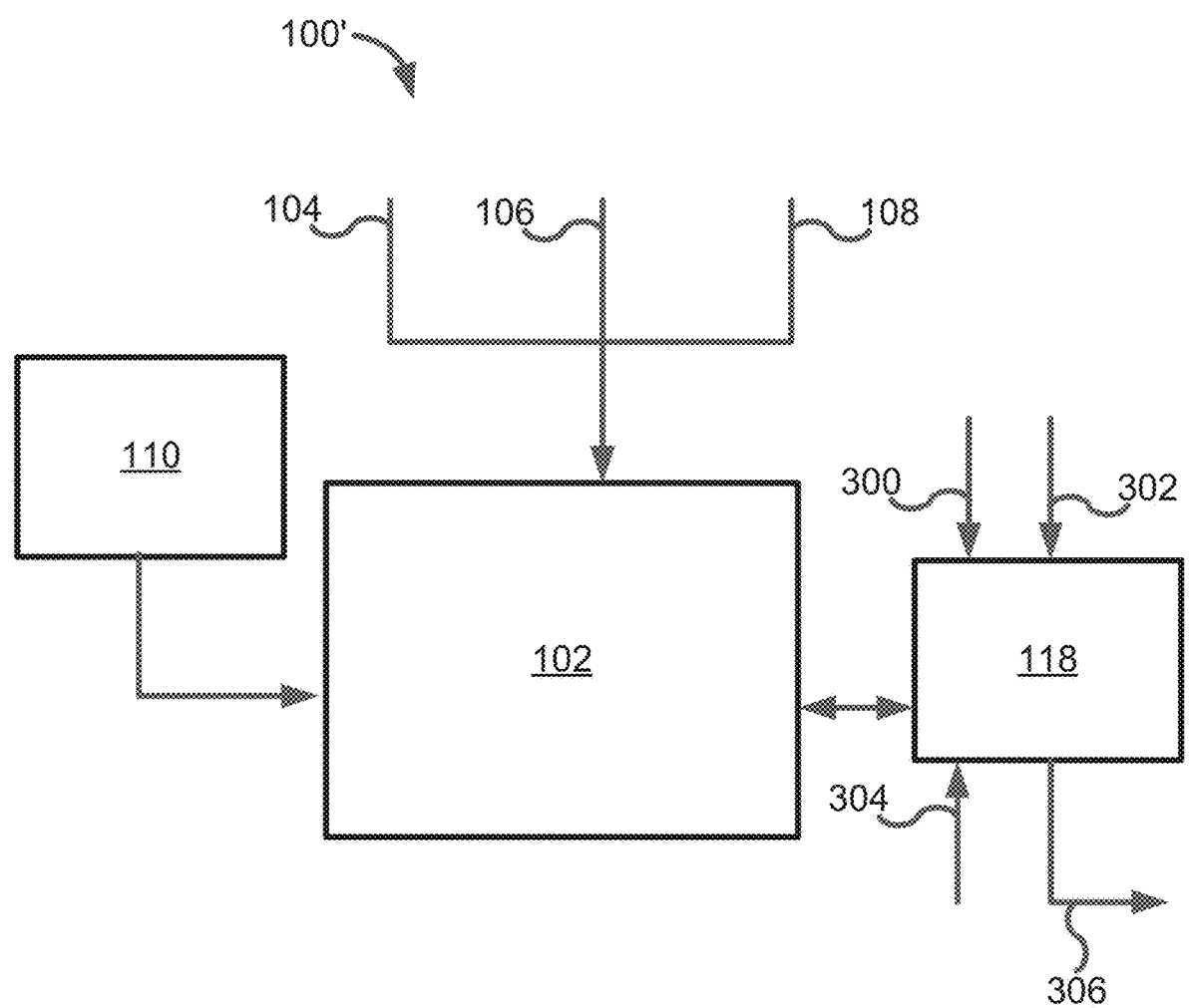
FIG. 3 is a schematic drawing of a system for producing highly activated silicate material according to some embodiments of the present disclosure.

Referring now to FIG. 3, and as discussed above, some embodiments of system 100, namely system 100', include process module 118 configured to initiate a non-silicate-activation process. In some embodiments, process module 118 is in communication with reaction chamber 102 for intermixing the molten slag with feedstock materials. In some embodiments, process module 118 utilizes molten slag provided by silicate material input 104 and/or heat source 110. In some embodiments, process module 118 includes a molten slag input 300 in communication with reaction chamber 102 which provides the molten slag to the reaction chamber. In some embodiments, process module 118 includes a feedstock input 302 in communication with reaction chamber 102 which provides feedstock to the reaction chamber. In some embodiments, process module 118 utilizes reaction medium provided by reaction medium input 106. In some embodiments, process module 118 includes a reaction medium input 304 in communication with reaction chamber 102 which provides a reaction medium to the reaction chamber. In some embodiments, process module 118 includes a product output 306 in communication with reaction chamber 102. In some embodiments, process module 118 utilizes reforming agent provided by reforming agent input 108. In some embodiments, the feedstock includes a reforming agent. In some embodiments, the feedstock includes a silicate mineral or legacy industrial silicate wastes. In some embodiments, the reaction medium includes certain gases. In some embodiments, the product at product output 306 includes activated silicate materials. In some embodiments, the product at product output 306 includes no activated silicate materials.

In some embodiments, the feedstock includes water and coal with an inert or reducing gas as the reaction medium, resulting in the product at product output 306 of carbon monoxide and hydrogen gas. In some embodiments, the feedstock includes water and methane with an inert or reducing gas as the reaction medium, resulting in the product at product output 306 of carbon monoxide and hydrogen gas. In each of these examples, however, little to no extra energy needs to be applied to drive the system, and thus the products are produced at essentially no energy cost.

EXAMPLES

In order to demonstrate the HTSR method and the hydrothermal silicate reforming method are able to produce highly activated silicate material for carbon sequestration, experiments have been designed and conducted on two typical silicate minerals, wollastonite ($CaSiO_3$) and serpentine ($Mg_3Si_2O_5(OH)_4$), and two typical industrial silicate solid wastes, iron slag and steel slag.

In the first and second batches of experiments, the reactivity of the HTSR products was studied with different stoichiometric ratio (SR) of the reforming agent to the silicate based material. In the third batch of experiments, the reactivity of the HTSR products produced with different reaction time, reaction environment, cooling process was studied. In the fourth batch of the experiments, the reactivity of the HTSR products produced with different types of reforming agents was studied. In the fifth batch of experiments, the reactivity of the hydrothermal reforming products was studied with lean reforming agent to mineral ratios.

Each batch of experiments consisted of three parts. First, material activation experiments were conducted on the aforementioned silicate materials to produce the activated silicate material. Second, the products of the material activation experiments were ground and sieved so that the particle size distribution of the products can be controlled. Third, dissolution experiments were conducted on the activated silicate materials with controlled particle size distribution. The elemental extraction conversions of the activated silicate materials during the dissolution experiments were calculated.

The HTSR Experiments with the Stoichiometric Ratio of Reforming Agent

The activated silicate materials were produced by the method of HTSR with the calculated stoichiometric ratio of mineral to reforming agent. In each experiment, a stoichiometric amount of solid sodium hydroxide (NaOH) was used as reforming agent, and mixed with wollastonite or serpentine. Then, the mixture was put into a muffle furnace at room temperature, and then heated up to the target reaction temperature and kept for a certain period of time. Next, the furnace is cooled down to the ambient temperature and the product is collected. The experimental matrix is shown in Table 1.

TABLE 1

HTSR experimental matrix

| Feed stock | Atmosphere | Reaction Temperature (° C.) | Reaction Time (min) |
|---|---|---|---|
| Wollastonite | Air | 650 | 50 |
| Wollastonite | Air | 1300 | 10 |
| Wollastonite + NaOH | Air | 650 | 50 |
| Wollastonite + NaOH | Air | 1300 | 10 |
| Serpentine | Air | 650 | 50 |
| Serpentine | Air | 1300 | 10 |
| Serpentine | Nitrogen | 650 | 50 |
| Serpentine + NaOH | Air | 650 | 50 |
| Serpentine + NaOH | Air | 1300 | 10 |
| Serpentine + NaOH | Nitrogen | 650 | 50 |

After these HTSR experiments, the compositions of all the samples were also tested. The products were then ground and sieved. The particle size distributions of all the samples were controlled to be from 110 μm to 700 μm roughly.

The activated silicate materials with controlled particle size distributions were then applied on a differential bed reactor to conduct dissolution experiments. The solvents collected from the dissolution experiments were tested with Inductively Coupled Plasma Optical Emission Spectroscopy (ICP-OES) study the concentrations of different elements dissolved in the solvents, and the conversions of the dissolution experiments were calculated based on the test results.

In each dissolution experiment, nitric acid having a pH of 2 was continuously pumped by an HPLC pump at 10 ml/min for 60 min to react with 20 mg sample fixed in a sample holder. The leachate was also collected continuously and analyzed using ICP-OES to determine the concentrations of different value materials in each sample. All the dissolution experiments were conducted at ambient temperature and ambient pressure for 1 hour.

Figure 4A:
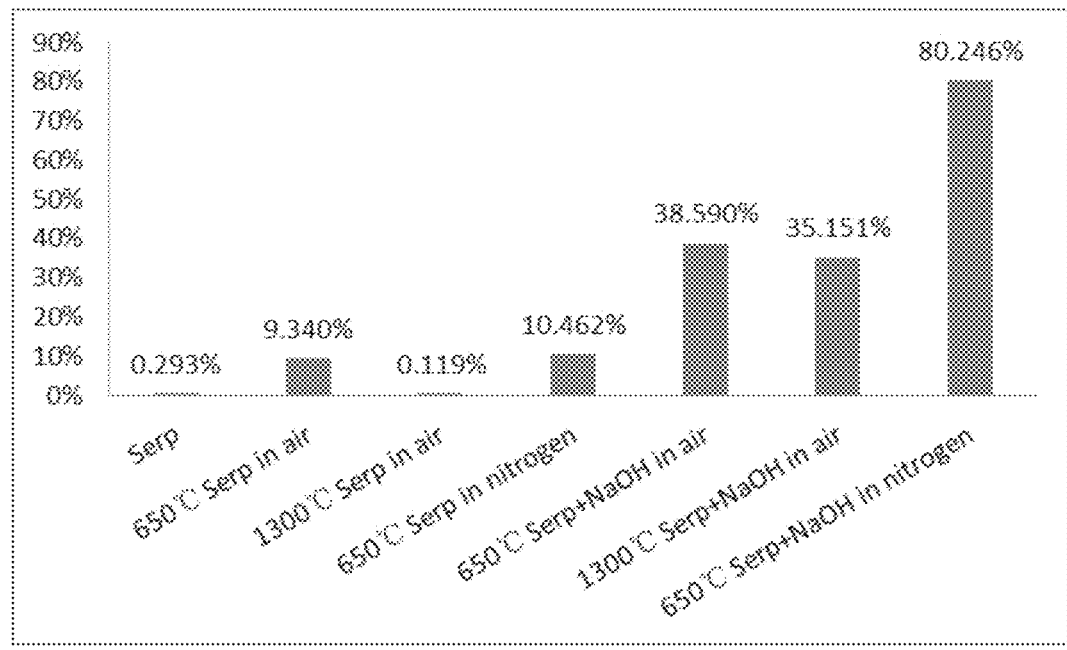
FIG. 4A portrays Mg extraction conversions of serpentine related materials using methods according to some embodiments of the present disclosure.
Figure 4B:
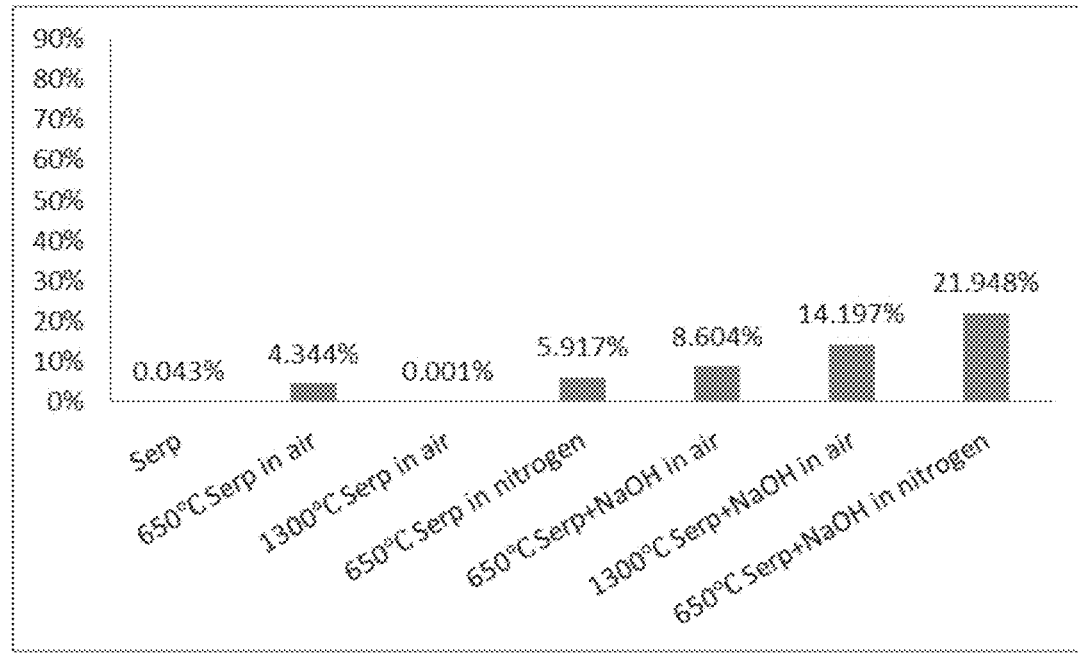
FIG. 4B portrays Si extraction conversions of serpentine related materials using methods according to some embodiments of the present disclosure.
Figure 4C:
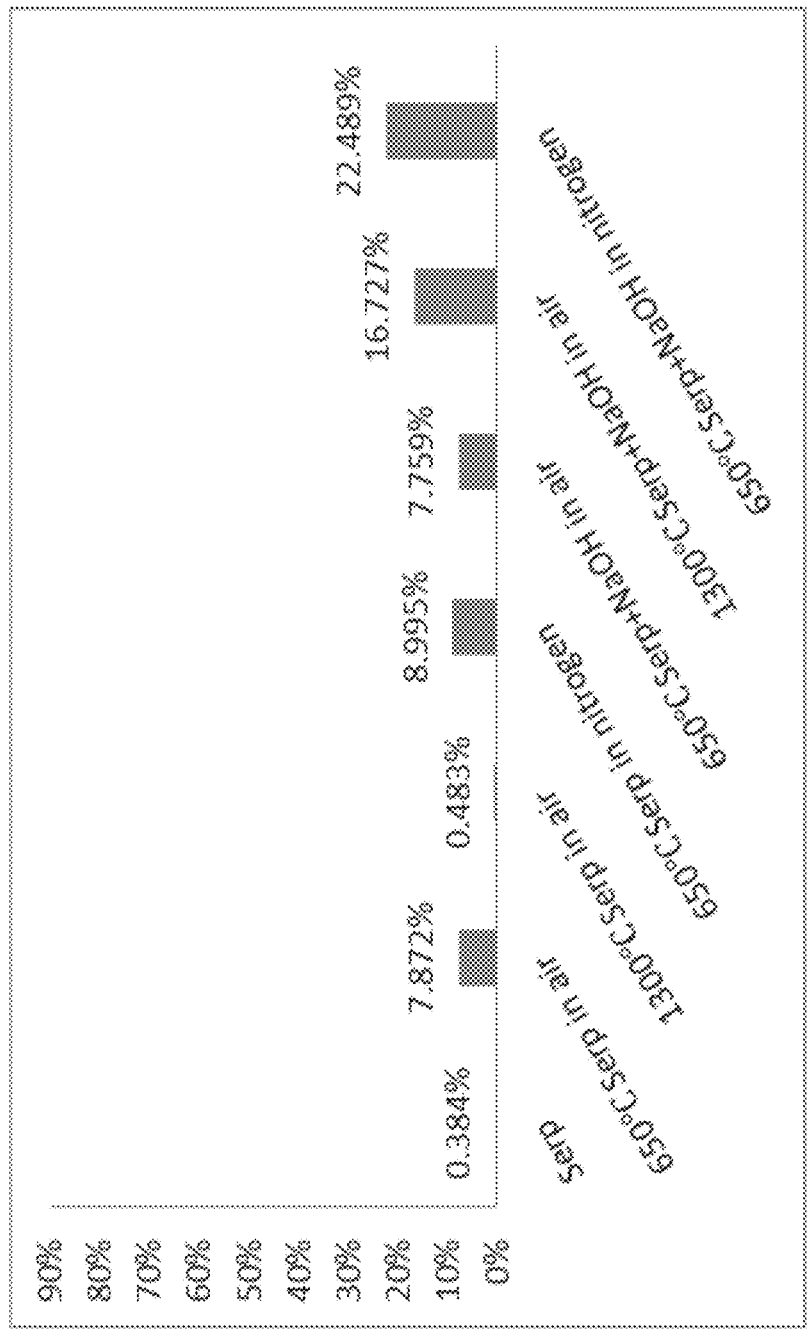
FIG. 4C portrays Fe extraction conversions of serpentine related materials using methods according to some embodiments of the present disclosure.
Figure 4D:
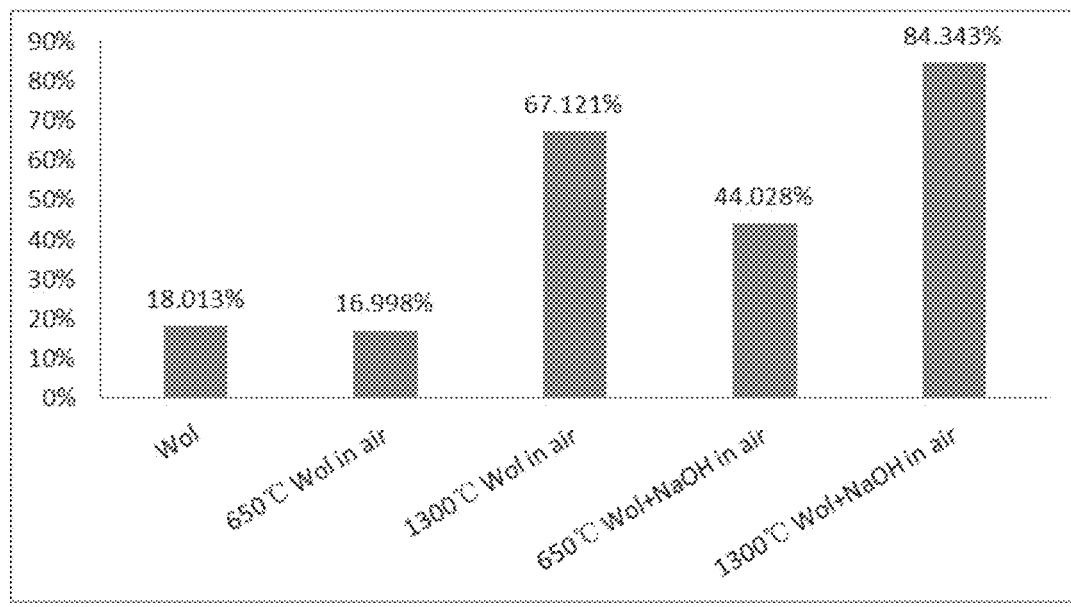
FIG. 4D portrays Ca extraction conversions of wollastonite related materials using methods according to some embodiments of the present disclosure.
Figure 4E:
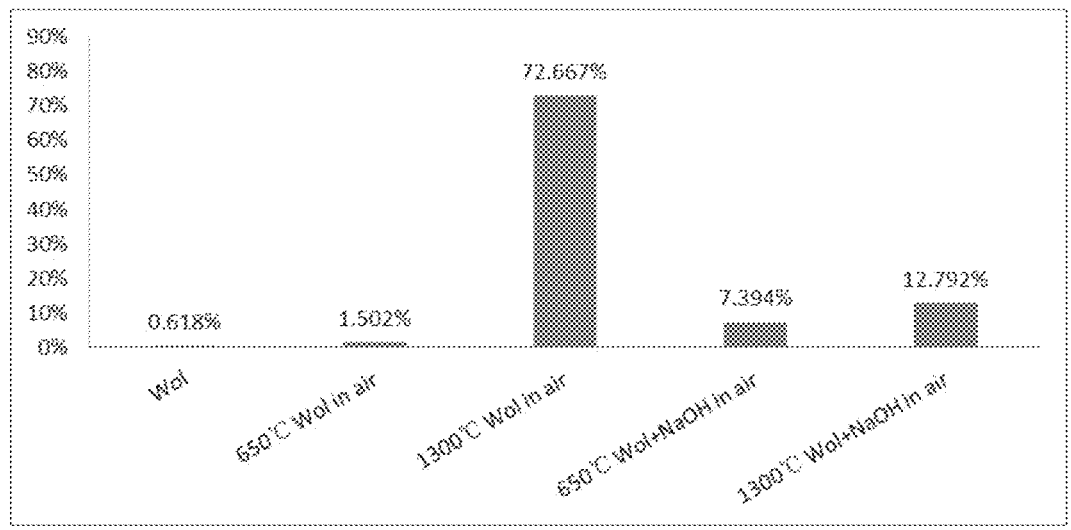
FIG. 4E portrays Si extraction conversions of wollastonite related materials using methods according to some embodiments of the present disclosure.
Figure 5A:
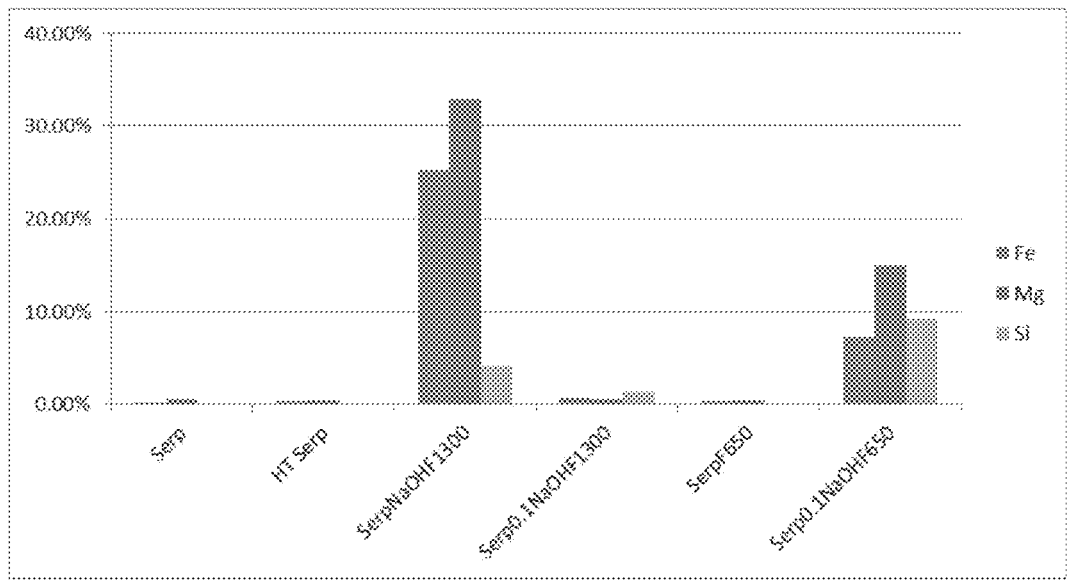
FIG. 5A portrays elemental extraction conversions of serpentine related materials using methods according to some embodiments of the present disclosure.
Figure 5B:
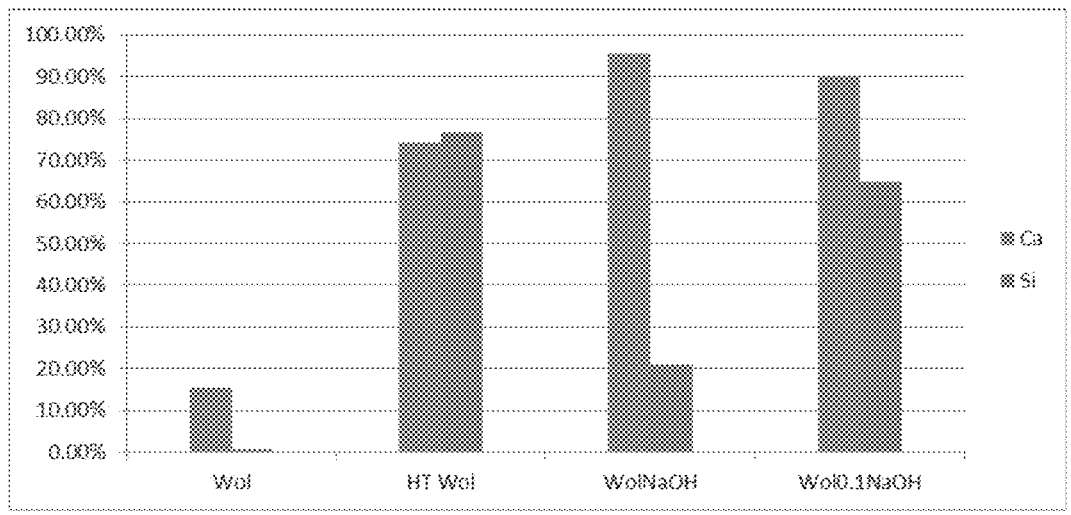
FIG. 5B portrays elemental extraction conversions of wollastonite related materials using methods according to some embodiments of the present disclosure.
Figure 5C:
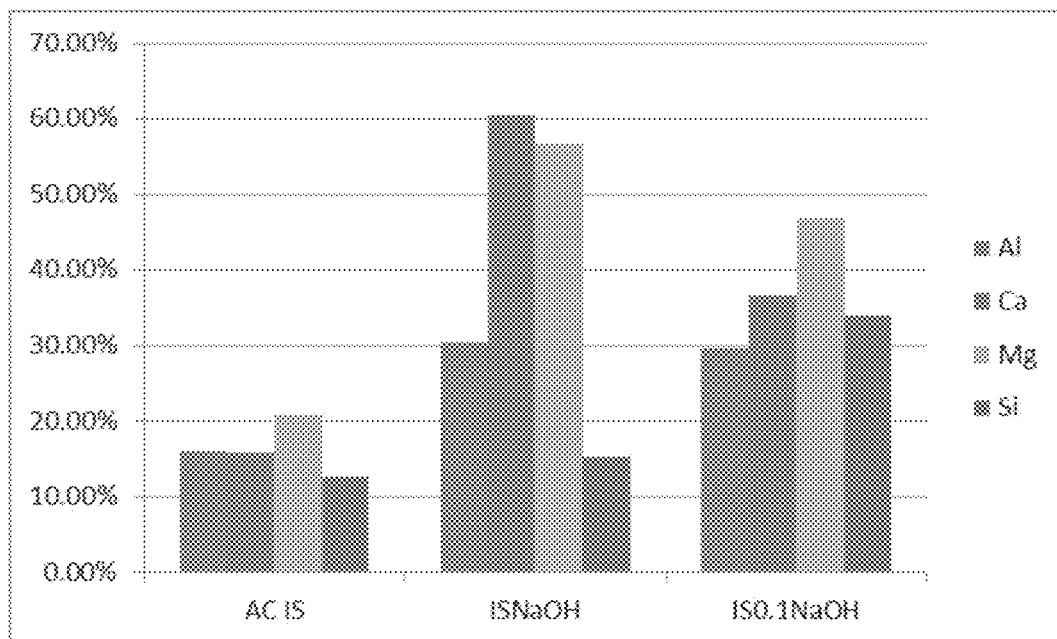
FIG. 5C portrays elemental extraction conversions of iron slag related materials using methods according to some embodiments of the present disclosure.
Figure 5D:
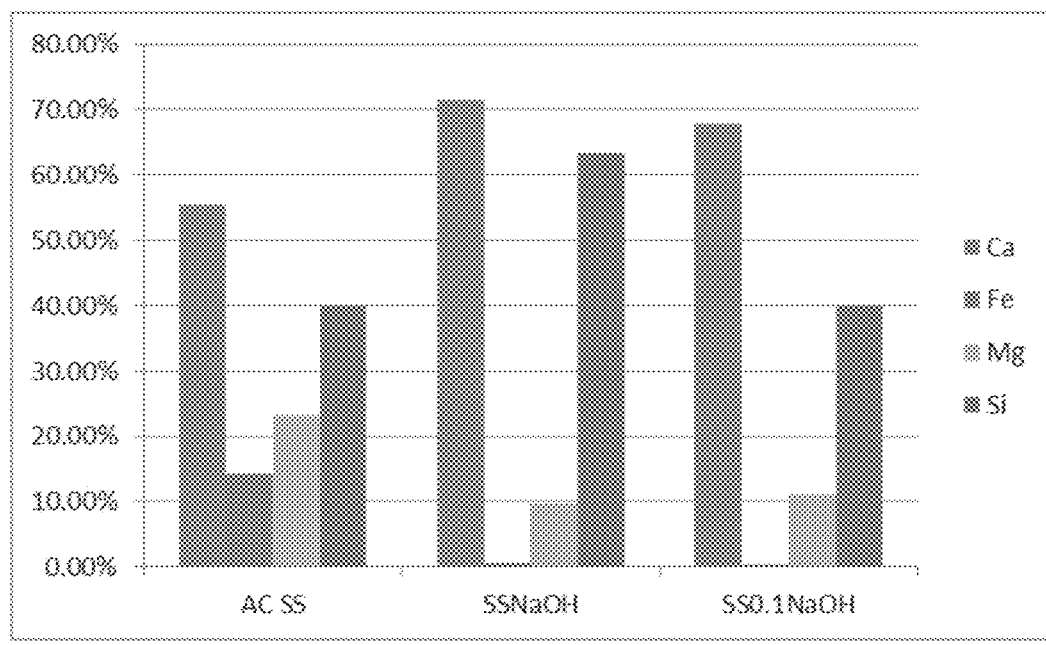
FIG. 5D portrays elemental extraction conversions of steel slag related materials using methods according to some embodiments of the present disclosure.

The extraction conversions of the major value materials of the serpentine related materials under study are shown in FIGS. 4A-4C. The extraction conversions of the major value materials of the wollastonite related materials under study are shown in FIGS. 4D-4E.

The HTSR Experiments at Lean Reforming Agent to Mineral Ratios

In this batch of experiments, the activated silicate materials were produced by the HTSR process with lean reforming agent to mineral ratios. In each experiment, solid sodium hydroxide (NaOH) was used as the reforming agent, and mixed with wollastonite, serpentine, air cooled iron slag (AC IS) or air cooled steel slag (AC SS) at a certain ratio (0.1 stoichiometric ratio and 1 stoichiometric ratio). Then, the mixture was put into a muffle furnace at room temperature, and the furnace was heated up to the target reaction temperature and kept for a certain period of time. Next, the furnace was cooled down to the ambient temperature and the product was collected. The experimental matrix is shown in Table 2.

TABLE 2

HTSR experimental matrix

| Feed stock | Atmosphere | Reaction Temperature (° C.) | Reaction Time (min) |
|---|---|---|---|
| Wollastonite (HT Wol) | Air | 1300 | 10 |
| Wollastonite + NaOH (SR) (WolNaOH) | Air | 1300 | 10 |
| Wollastonite + NaOH (0.1 SR) (Wol0.1NaOH) | Air | 1300 | 10 |
| Serpentine (HT Serp) | Air | 1300 | 10 |
| Serpentine + NaOH (SR) (SerpNaOHF1300) | Air | 1300 | 10 |

TABLE 2-continued

HTSR experimental matrix

| Feed stock | Atmosphere | Reaction Temperature (° C.) | Reaction Time (min) |
|---|---|---|---|
| Serpentine + NaOH (0.1 SR) (Serp0.1NaOHF1300) | Air | 1300 | 10 |
| Serpentine (SerpF650) | Air | 650 | 10 |
| Serpentine + NaOH (0.1 SR) (Serp0.1NaOHF650) | Air | 650 | 10 |
| Iron Slag + NaOH (SR) (ISNaOH) | Air | 1300 | 10 |
| Iron Slag + NaOH (0.1 SR) (IS0.1NaOH) | Air | 1300 | 10 |
| Steel Slag + NaOH (SR) (SSNaOH) | Air | 1300 | 10 |
| Steel Slag + NaOH (0.1 SR) (SS0.1NaOH) | Air | 1300 | 10 |

After these HTSR experiments, the compositions of all the samples were also tested. The products are then ground and sieved. The particle size distributions of all the samples are controlled to be from 106 μm to 208 μm. All the dissolution experiments were conducted at ambient temperature and ambient pressure for 1 hour.

The extraction conversion results of the major elements of the samples are shown in FIGS. 5A-5D.

The HTSR Experiments at Lean Reforming Agent to Mineral Ratios with Different Reaction Temperatures, Reaction Times and Reaction Atmospheres In this batch of experiments, the activated silicate materials were produced by the HTSR process with 0.1 of the stoichiometric ratio of reforming agent to mineral with different reaction times, reaction atmospheres and cooling processes. In each experiment, solid sodium hydroxide (NaOH) was used as reforming agent and mixed with serpentine. Then, the mixture was put into a muffle furnace with a certain atmosphere at room temperature and the furnace was heated up to the target reaction temperature and kept for a certain period of time. Next, the product was cooled down to the room temperature with a certain cooling process. The experimental matrix is shown in Table 3.

TABLE 3

HTSR experimental matrix

| Feed stock | Atmosphere | Reaction Temperature (° C.) | Cooling Process | Reaction Time (min) |
|---|---|---|---|---|
| Serpentine (SerpF650) | Air | 650 | Annealing | 10 |
| Serpentine + NaOH (0.1SR) (Serp0.1NaOHF650) | Air | 650 | Annealing | 10 |
| Serpentine + NaOH (0.1 SR) (Serp0.1NaOHF6501 hr) | Air | 650 | Annealing | 60 |
| Serpentine (SerpN2F650) | N2 | 650 | Annealing | 10 |
| Serpentine + NaOH (0.1 SR) (Serp0.1NaOHN2F650) | N2 | 650 | Annealing | 10 |
| Serpentine + NaOH (SR) (SerpNaOHN2F6501 hr) | N2 | 650 | Annealing | 60 |
| Serpentine + NaOH (SR) (SerpNaOHF6501 hr) | Air | 650 | Annealing | 60 |
| Serpentine (HT Serp) | Air | 1300 | Annealing | 10 |
| Serpentine + NaOH (0.1 SR) (Serp0.1NaOH) | Air | 1300 | Annealing | 10 |
| Serpentine + NaOH (0.1 SR) (Serp0.1NaOHWQ) | Air | 1300 | Water Quenching | 10 |
| Serpentine + NaOH (0.1 SR) (Serp0.1NaOHAC) | Air | 1300 | Air Cooling | 10 |

After the reforming experiments, the compositions of all the samples were also tested. The products were then ground and sieved. The particle size distributions of all the samples were controlled to be from 106 μm to 208 μm. All the dissolution experiments were conducted at ambient temperature and ambient pressure for 1 hour.

Figure 6A:
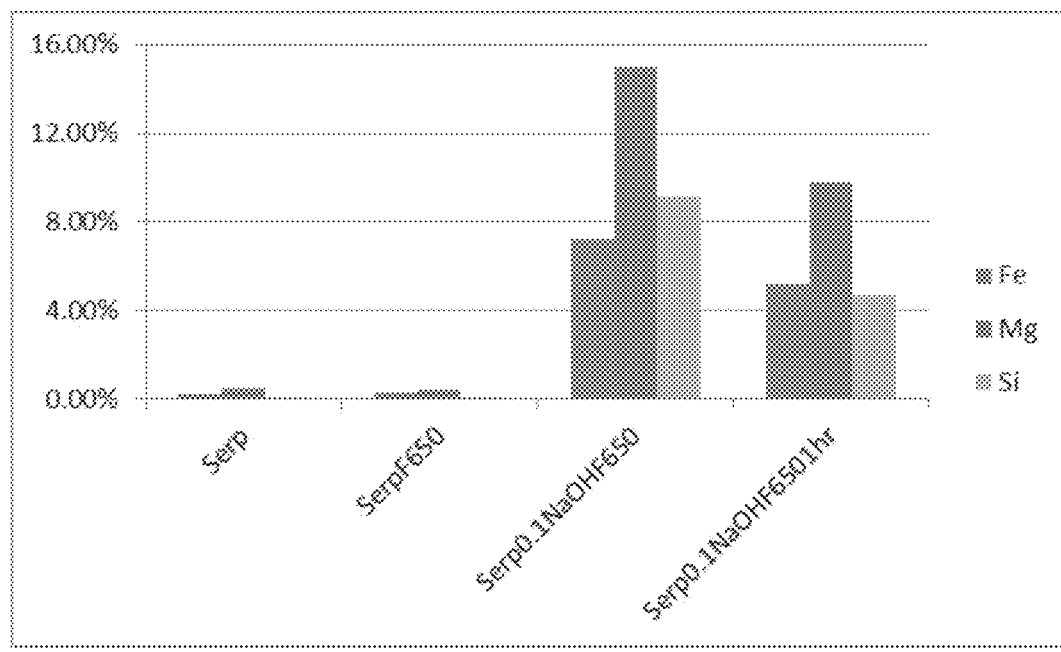
FIG. 6A portrays elemental extraction conversions of serpentine related materials with different reaction time using methods according to some embodiments of the present disclosure.
Figure 6B:
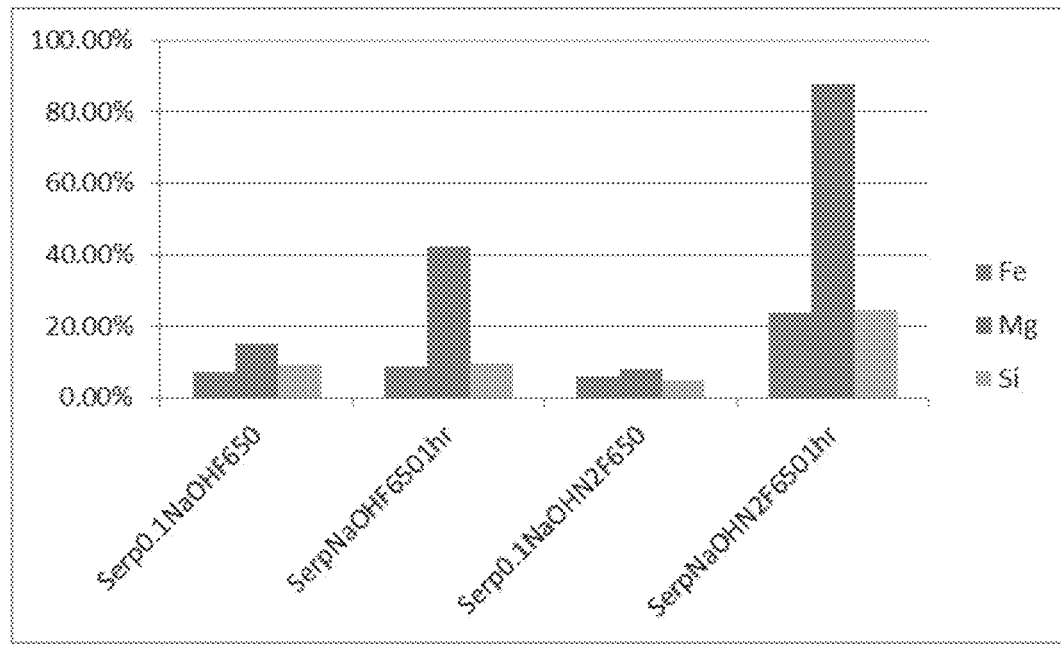
FIG. 6B portrays elemental extraction conversions of serpentine related materials with different reaction atmosphere using methods according to some embodiments of the present disclosure.
Figure 6C:
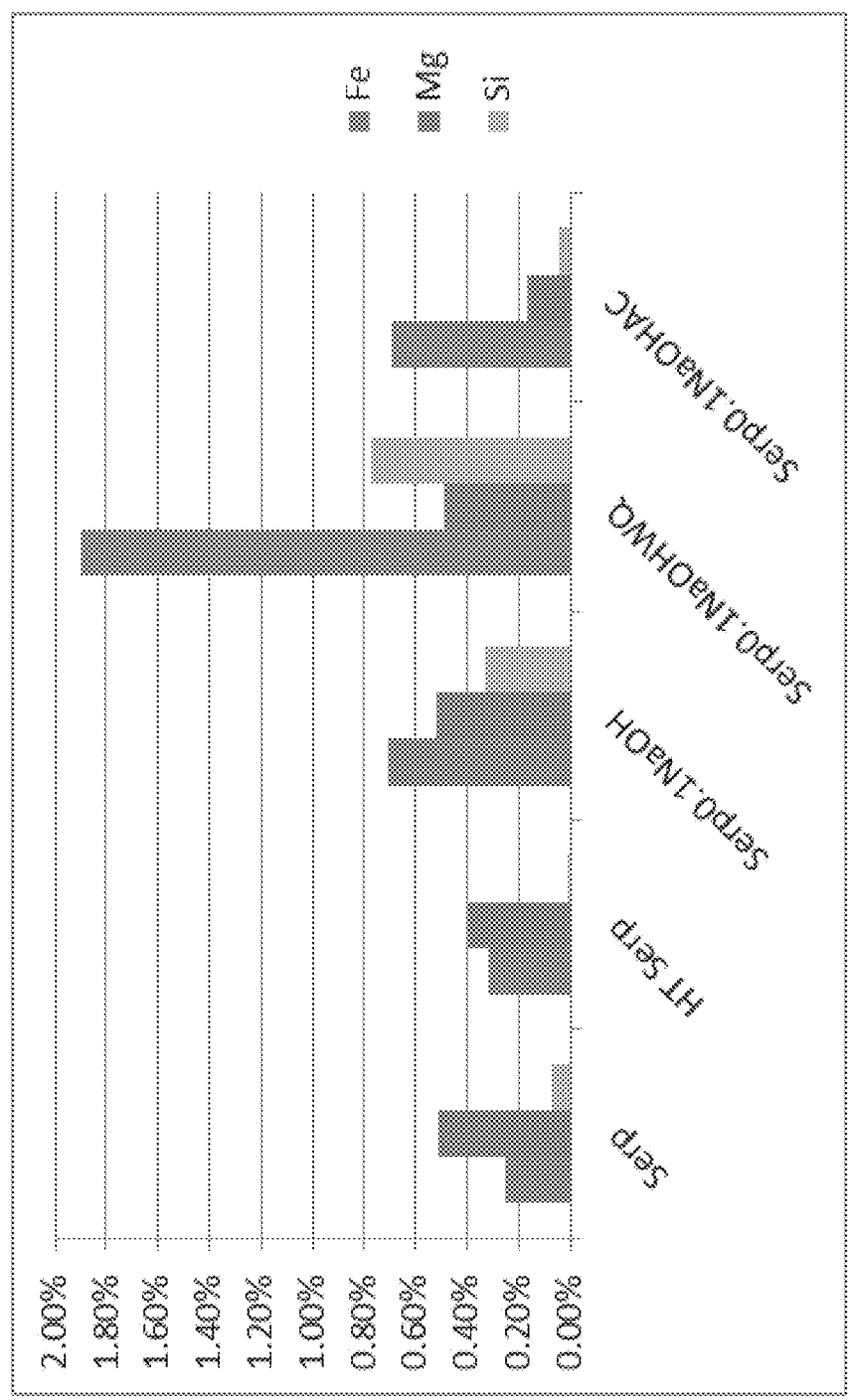
FIG. 6C portrays elemental extraction conversions of serpentine related materials with different cooling process using methods according to some embodiments of the present disclosure.

The extraction conversion results of the major elements of the samples are shown in FIGS. 6A-6C.

The HTSR Experiments at Lean Reforming Agent to Mineral Ratios with Different Reforming Agents In this batch of experiments, the activated silicate materials were produced by the method of HTSR with 0.1 of the stoichiometric ratio of reforming agent to mineral with different types of fluxing agents. In each experiment, the fluxing agent was mixed with serpentine. Then, the mixture was put into a muffle furnace at room temperature, and the furnace was heated up to the target reaction temperature and kept for a certain period of time. Next, the product was cooled down together with the furnace to the room temperature. The experimental matrix is shown in Table 4.

TABLE 4

HTSR experimental matrix

| Feed stock | Atmosphere | Reaction Temperature (° C.) | Reaction Time (min) |
|---|---|---|---|
| Serpentine (HT Serp) | Air | 1300 | 10 |
| Serpentine + KOH (0.1SR) (Serp0.1NaOH) | Air | 1300 | 10 |
| Serpentine + NaOH (0.1 SR) (Serp0.1NaOH) | Air | 1300 | 10 |
| Serpentine + LiOH (0.1 SR) (Serp0.1LiOH) | Air | 1300 | 10 |
| Serpentine + $Na_2CO_3$ (0.1 SR) (Serp0.1Na2CO3) | Air | 1300 | 10 |
| Serpentine + $LiBO_2$ (0.1 SR) (Serp0.1LiBO2) | Air | 1300 | 10 |
| Serpentine + $Li_2B_4O_7$ (0.1 SR) (Serp0.1Li2B4O7) | Air | 1300 | 10 |
| Serpentine + NaCl (0.1 SR) (Serp0.1NaCl) | Air | 1300 | 10 |
| Serpentine + LiCl (0.1 SR) (Serp0.1LiCl) | Air | 1300 | 10 |

TABLE 4-continued

HTSR experimental matrix

| Feed stock | Atmosphere | Reaction Temperature (° C.) | Reaction Time (min) |
|---|---|---|---|
| Serpentine + B$_2$O$_3$ (0.1 SR) (Serp0.1B2O3) | Air | 1300 | 10 |

After the reforming experiments, the compositions of all the samples were also tested. The products are then ground and sieved. The particle size distributions of all the samples were controlled to be from 106 μm to 208 μm. All the dissolution experiments were conducted at ambient temperature and ambient pressure for 1 hour.

Figure 7:
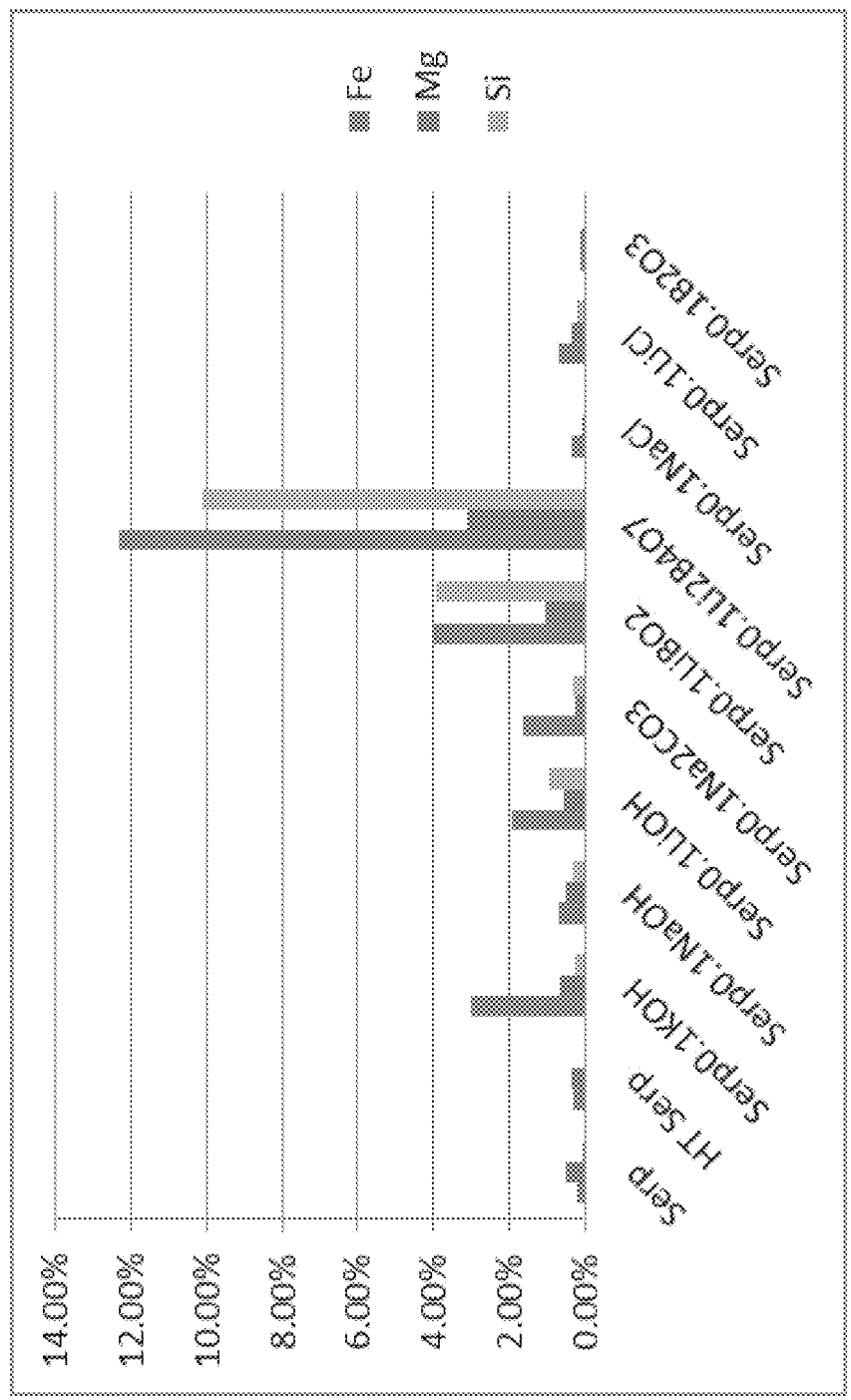
FIG. 7 portrays elemental extraction conversions of serpentine related materials with different reforming agents using methods according to some embodiments of the present disclosure.

The extraction conversion results of the major elements of the samples are shown in FIG. 7.

The Hydrothermal Reforming Experiments at Lean Reforming Agent to Mineral Ratios In this batch of experiments, the activated silicate materials were produced by the method of hydrothermal reforming with 0.1 of the stoichiometric ratio of reforming agent to mineral. In each experiment, 0.1 stoichiometric amount of NaOH was mixed with serpentine or wollastonite. Then, the mixture was put into DI water to prepare a slurry of 15 percent by weight. Then, the mixture was put into a closed reactor, which was then pressurized and heated up to the target reaction temperature and kept for a certain period of time. Next, the product was cooled down to room temperature. The experimental matrix is shown in Table 5.

TABLE 5

Hydrothermal reforming experimental matrix

| Feed stock | Atmosphere | Reaction Temperature (° C.) | Reaction Time (min) |
|---|---|---|---|
| Serpentine + NaOH (0.1SR) (SerpHTA) | Air | 185 | 120 |
| Wollastonite + NaOH (0.1 SR) (WolHTA) | Air | 185 | 120 |

After the hydrothermal reforming experiments, the compositions of all the samples were also tested. The products were then ground and sieved. The particle size distributions of all the samples were controlled to be from 106 μm to 208 μm. All the dissolution experiments were conducted at ambient temperature and ambient pressure for 1 hour.

Figure 8A:
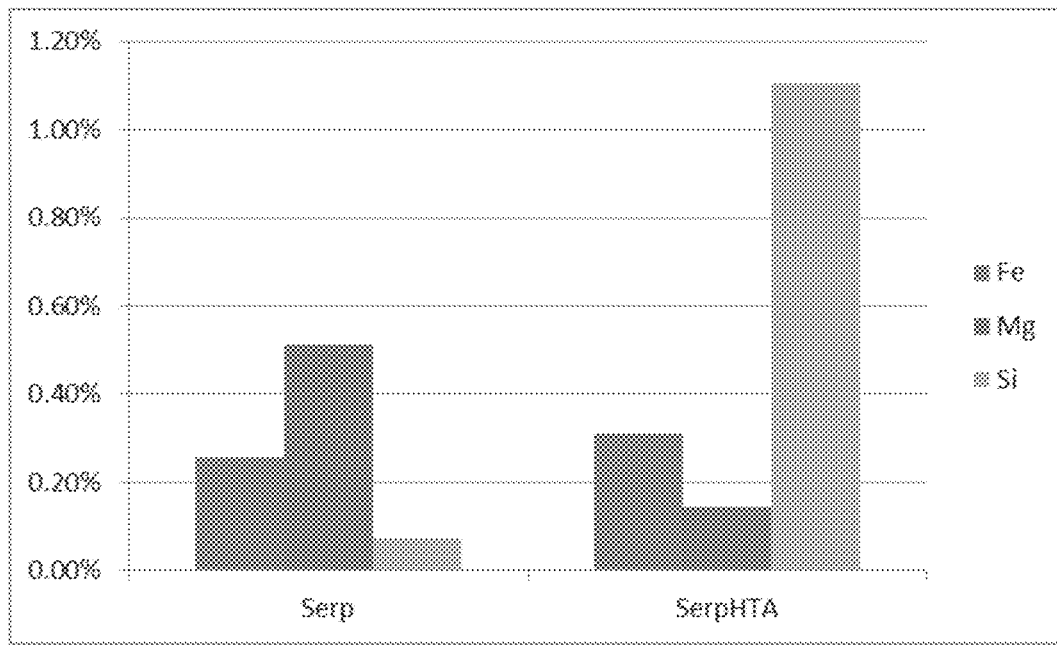
FIG. 8A portrays elemental extraction conversions of serpentine related materials using methods according to some embodiments of the present disclosure.
Figure 8B:
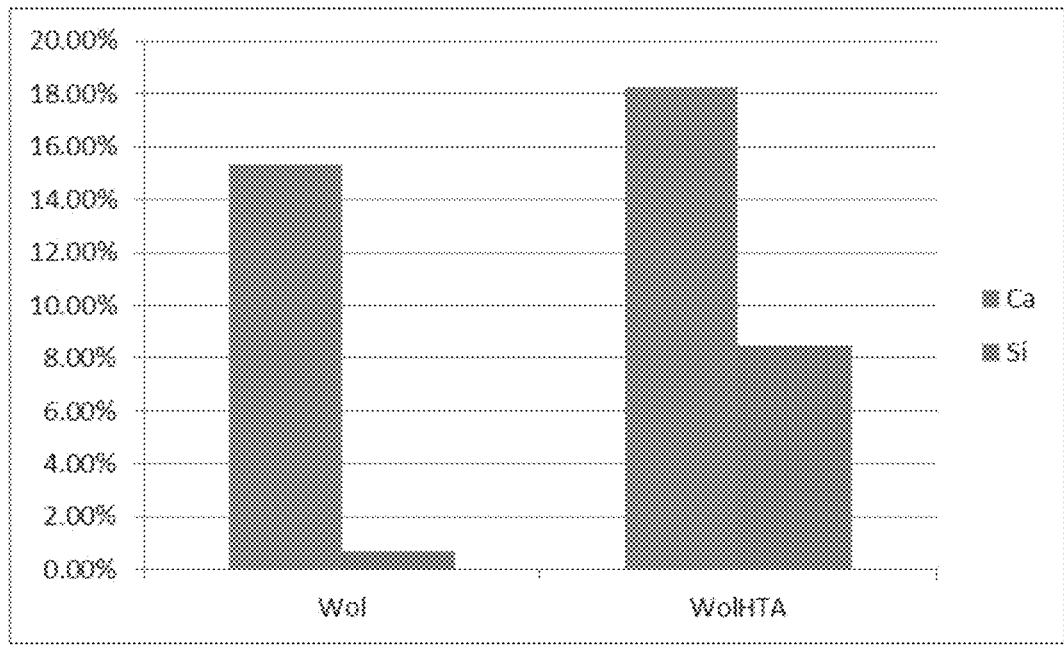
FIG. 8B portrays elemental extraction conversions of wollastonite related materials using methods according to some embodiments of the present disclosure.

The extraction conversion results of the major elements of the samples are shown in FIGS. 8A and 8B.

Systems and methods of the present disclosure yield, via a reforming reaction with a reforming agent, a silicate material product from either natural or man-made (i.e., industrial byproduct) sources that is activated and highly reactive. By this activation, the kinetics and conversion of the elemental extraction process with the activated silicate materials are improved as compared to that with non-activated silicate material. Thus the value materials within the activated silicate material, e.g., Ca, Mg, Fe, Al, Si, etc., can be readily extracted for use in other processes. Additionally, the activated silicate material becomes a desirable target for sequestration of carbon dioxide.

The silicate is activated by reacting with a reforming agent via hydrothermal or HTSR processes. These hydrothermal and HTSR processes can activate the silicate material using industrial waste energy and recyclable material, so that the overall energy cost and consumption associated with activating the silicate materials are reduced. Further, the hydrothermal and HTSR processes can be integrated with other processes such as coal gasification or steam reforming, increasing the benefit provided by the recycled industrial waste energy and material.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of producing an activated silicate material comprising: providing a silicate source material; reforming the silicate source material to the activated silicate material with a reforming agent in a reforming reaction; and providing the activated silicate material to an elemental extraction process,
    wherein the reforming the silicate source material is performed using a high temperature silicate reforming (HTSR) process at about 300° C. to about 1500° C., wherein a weight ratio of the silicate source material to the reforming agent is about 0.1:1 to about 100:1, wherein the silicate source material comprises slag, mine tailing, fly ash, kiln dust, serpentine, olivine, wollastonite or a combination thereof.

2. The method according to claim 1, wherein the reforming the silicate source material further comprises applying heat from an industrial energy production source, an industrial energy production process, a waste energy source, a molten iron slag, a molten steel slag, a flue gas, an exhaust gas, an exhausted steam, or a combination thereof.

3. The method according to claim 1, wherein the reforming the silicate source material further comprises: performing in an anhydrous conditions.

4. The method according to claim 3, wherein reforming the silicate source material further comprises: intermixing the reforming agent with a molten slag.

5. The method according to claim 3, wherein the reforming agent comprises boron trioxide (B$_2$O$_3$), lithium tetraborate (Li$_2$B$_4$O$_7$), silica (SiO$_2$), ammonium (NH$^{4+}$) based acidic salts; borax (Na$_2$B$_4$O$_7$•10H$_2$O), lithium metaborate (LiBO$_2$), sodium hydroxide (NaOH), potassium hydroxide (KOH), sodium carbonate/bicarbonate (Na$_2$CO$_3$/NaHCO$_3$), ammonium based basic salts; sodium chloride (NaCl), fluorite (CaF$_2$), alumina (Al$_2$O$_3$), ammonium based neutral salts, or a combination thereof.

6. The method according to claim 1, wherein the elemental extraction process further comprises a mineral carbonation process, oxides/hydroxide production process, halide production process, ferrous metal production process, non-ferrous metal production process, rare earth production process, or a combination thereof.

* * * * *